April 1, 1958

S. E. GAIL 2,828,525

CLAMPING BAND

Filed Nov. 19, 1954

*INVENTOR.*
STEWART E. GAIL
BY

ATTORNEY

2,828,525
Patented Apr. 1, 1958

2,828,525

CLAMPING BAND

Stewart E. Gail, Maple Heights, Ohio, assignor to Jack & Heintz, Inc., Cleveland, Ohio, a corporation of Delaware Application November 19, 1954, Serial No. 470,050

4 Claims. (Cl. 24—279)

This invention relates to improvements in clamping bands and has for one of its primary objects to provide a clamping band with two opposed ends so constructed as to provide housings for such releasable securing and clamping accessories as nuts and bolts or the like.

Another object is to provide a clamping band in which the opposed housings are either rigid with, or preferably integral with, the remainder of the clamping band and in which the housing portion of the band is no wider transversely than the remainder of the band.

Another object is to provide such a clamping band in which the opposed housings are formed by side plates integral with the remainder of the clamping band, and in which the side plates are formed as circumferentially inclined ramps whose outer transverse faces are flush with the transverse side faces of the remainder of the clamping band in order to obtain the maximum strength of the clamping band assembly while maintaining the amount of material and the overall transverse width of the clamping band assembly to a minimum, especially for installations in crowded environments where space is at a premium.

A further object is to so form the opposed ends of the clamping band that they will, together with the side faces, form generally transversely semi-cylindrical housings or pockets, to rotatably receive similarly semi-cylindrical, or barrel type, releasable securing and clamping accessories, such as bolts, nuts, washers and the like.

A further object is to provide in each of such securing and clamping accessory housings inherent keeper elements for ease of installation and proper alignment of the securing and tightening accessories, after which they may be tightened without danger of inadvertent dislodgment or misalignment and for the purpose of preventing any inadvertent dislodgment or misalignment whether the clamping band is being tightened or loosened.

With the foregoing and other objects in view, the invention resides in the combination of parts and in the details of construction set forth in the following specification and appended claims, certain embodiments thereof being illustrated in the accompanying drawings, in which:

Figure 1:
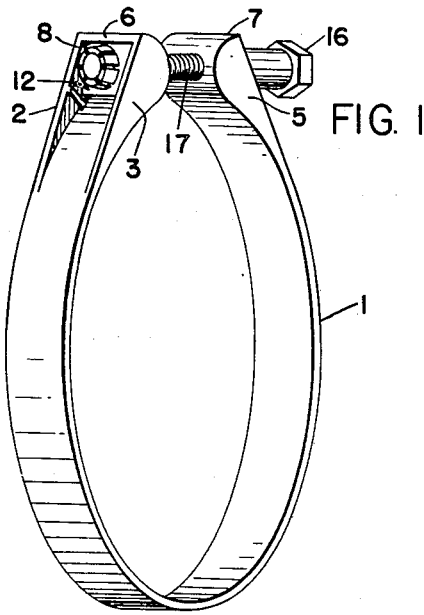
Figure 1 is a view in perspective of the clamping band including the securing and tightening nut and bolt accessories to a certain degree of adjustment.
Figure 2:
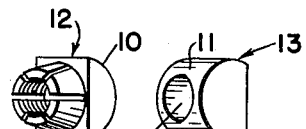
Figure 2 is a composite view in perspective of the two transversely cylindrical elements, exclusive of the screw bolt, of the securing and clamping accessory, showing one unthreaded element, or washer, through which the screw bolt extends and the other element being interiorly screw threaded to constitute the nut to mate with the external screw threads of the screw bolt.

Referring more particularly to the drawings, I propose to provide a generally thin and narrow clamping band 1 of high tensile strength. The conventional practice is to utilize a threaded attachment to the opposed ends of the split clamping band for obtaining circumferential forces and resulting radial forces. This requires either a large head on the two opposed ends of the band or a substantial increase in width over that necessary for the remainder of the band in order to provide for acceptable stresses in attaching opposed ends of the band.

As a distinct advantageous improvement over such conventional practice, I propose to form on the ends of the split clamping band 1 integral side plates 2 and 3 and 4 and 5, the outer side faces of each of which is flush, in alignment with, and no wider than the remainder of the band 1 and preferably integral therewith. As shown in the drawings, these side plates include circumferentially radially outwardly inclined ramps joined together by integral termini transverse cross pieces 6 and 7. Moreover, this construction of the ends of the clamping band 1 affords pockets with transversely semi-cylindrical outer bearing surfaces 8 and 9. These pockets are adapted to respectively receive the semi-cylindrical surfaces 10 and 11 of barrel type nut 12 and barrel type washer 13 so that the latter are rotatable about their longitudinal axes in their respective pockets. Washer 13 is provided with a hole 14 to loosely receive the shank 15 of a bolt 16. The shank 15 has external screw threads 17 to mate with internal screw threads of nut 12.

Figure 3:
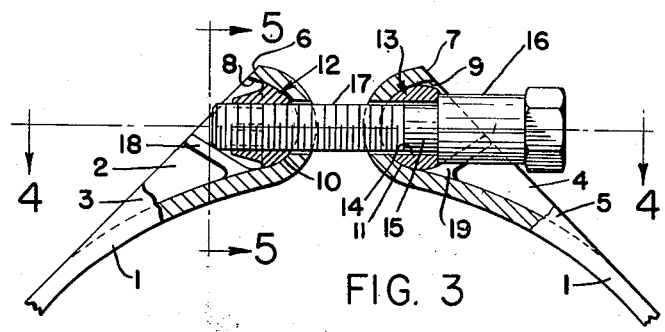
Figure 3 is an enlarged fragmentary view in section through the opposed ends of the clamping band, including the securing and tightening accessory in another, and greater, degree of tightening adjustment.
Figure 4:
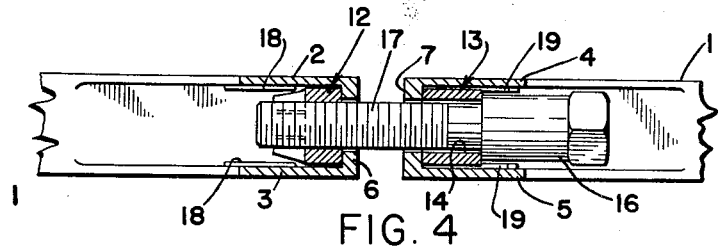
Figure 4 is a view in section taken along line 4—4 of Figure 3.
Figure 5:
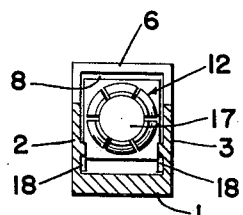
Figure 5 is a view taken along line 5—5 of Figure 3.

As clearly shown in Figures 3 and 4, I provide a pair of keepers 18 for semi-cylindrical nut 12 and a similar pair of keepers 19 for semi-cylindrical member 13. Keepers 18 are in the form of shallow flanges, rigid with, or preferably integral with, the internal faces of side face members 2 and 3 of the band 1 and keepers 19 are also in the form of shallow flanges, rigid with, or preferably integral with, the internal faces of side face members 4 and 5 of the band 1. These keepers preferably extend outwardly to be flush with the outer edges of the side face members 2, 3, 4 and 5. As shown in Figure 3, the keepers are constructed to extend at an angle to the longitudinal axis of the bolt.

In practice, nut 12 and washer 13 are readily inserted in their respective pockets between the keepers 18 and 19 and the inside arc of curvature of the cylindrical surfaces 10 and 11 of the pockets. The threaded shank 17 of the bolt 16 is then easily passed through hole 14 in washer 13 and engaged with the internal screw threads of nut 12, and washer 13, keepers 18 and 19 and the inner cylindrical surfaces 10 and 11 of the two pockets are so predetermined that upon initial engagement of screw shank 17 with the threads of nut 12, and as long as any such engagement continues, removal of either nut 12 or washer 13 from its respective pocket is precluded. During further tightening of the clamping band, regardless of the particular object to be clamped or the environmental apparatus, the mating semi-cylindrical surfaces of nut 12 and washer 13 and their pockets permit relative rotation to insure proper self-alignment and equal distribution of the clamping forces.

Thus, it will be seen that I have provided a clamping band assembly in which by reason of the incorporation of side plates integral with the two ends of the clamping band, I obtain maximum strength in a narrow band of uniform width so as to enable application in crowded space installations. My cylindrical attachment for the tightening bolt provides for the elimination of side or angular stresses on the bolt. As the result of ordinary cylindrical design, improper installation of cylindrical washers could bring about damage to the assembly by reason of improper application of tightening forces if the nut is rotated about the axis of the screw to disturb proper engagement of the nut or washer in their pockets. This accidental improper assembly is precluded by my keepers, which not only prevent improper assembly of the components, but also confine the nut and washer in their pockets as long as the bolt is engaged by the nut. Thus preliminary loose assembly of the band assures proper operation simply by tightening or loosening of the screw.

I claim:

1. In a clamping band assembly for clamping substantially cylindrical members, a rigid circular split band whose inner surface is substantially circular, said band having end portions including external pockets, external side plates formed integrally with each of the end portions of the band, the outer side faces of said side plates being substantially flush with the corresponding side edges of said band, and keepers comprising relatively shallow flanges on each of the inner faces of each of said side plates, said keepers extending angularly outwardly to a point flush with the outer edges of said side plates, one of said pockets being adapted to removably receive a nut and the other a washer within the confines of said side plates and said keepers, and said pockets having aligned holes adapted to receive a threaded bolt extending through said washer and nut, the angle of disposition of said keepers being so predetermined as to preclude inadvertent removal of said nut or washer as long as said threaded bolt is in threaded engagement with said nut.

2. In a clamping band assembly for clamping substantially cylindrical members, a rigid circular split band whose inner surface is substantially circular, said band having end portions including external semicylindrical pockets, external side plates formed integrally with each of the end portions of the band, the outer side faces of said side plates being substantially flush with the corresponding side edges of said band, and keepers comprising relatively shallow flanges on each of the inner faces of each of said side plates, said keepers extending angularly outwardly to a point flush with the outer edges of said side plates, one of said pockets being adapted to removably receive a barrel type nut and the other a barrel type washer within the confines of said side plates and said keepers, and said pockets having aligned holes adapted to receive a threaded bolt extending through said washer and nut, the angle of disposition of said keepers being so predetermined as to preclude inadvertent removal of said nut or washer as long as said threaded bolt is in threaded engagement with said nut.

3. In a clamping band assembly for clamping substantially cylindrical members, a rigid circular split band whose inner surface is substantially circular, said band having end portions including external pockets, external side plates formed integrally with each of the end portions of the band, and keepers comprising relatively shallow flanges on each of the inner faces of each of said side plates, said keepers extending angularly outwardly to a point flush with the outer edges of said side plates, one of said pockets being adapted to removably receive a nut and the other a washer within the confines of said side plates and said keepers, and said pockets having aligned holes adapted to receive a threaded bolt extending through said washer and nut, the angle of disposition of said keepers being so predetermined as to preclude inadvertent removal of said nut or washer as long as said threaded bolt is in threaded engagement with said nut.

4. In a clamping band assembly for clamping substantially cylindrical members, a rigid circular split band whose inner surface is substantially circular, said band having end portions including external semicylindrical pockets bridged by an external integral end top cross piece, external side plates formed integrally with each of the end portions of the band, and keepers comprising relatively shallow flanges on each of the inner faces of each of said side plates, said keepers extending angularly outwardly to a point flush with the outer edges of said side plates, one of said pockets being adapted to removably receive a barrel type nut and the other a barrel type washer within the confines of said side plates and between said cross pieces and said keepers, and said pockets having aligned holes adapted to receive a threaded bolt extending through said washer and nut, the angle of disposition of said keepers being so predetermined as to permit manual insertion of said washer and said nut in said pocket underneath said end top cross pieces and to preclude inadvertent removal of said nut or washer as long as said threaded bolt is in threaded engagement with said nut.

References Cited in the file of this patent

UNITED STATES PATENTS

| | | |
|---|---|---|
| 519,312 | Arthur | May 8, 1894 |
| 830,110 | Spencer | Sept. 4, 1906 |
| 1,277,398 | Elliott | Sept. 3, 1918 |
| 1,621,490 | Bovey et al. | Mar. 22, 1927 |
| 2,341,828 | Tetzlaff | Feb. 15, 1944 |
| 2,601,420 | Stackhouse | June 24, 1952 |